United States Patent [19]

Matsuura et al.

[11] Patent Number: 4,942,804

[45] Date of Patent: Jul. 24, 1990

[54] PISTON WITH CERAMIC INSERT THAT COVERS PISTON HEAD PORTION DEFINING CAVITY

[75] Inventors: Tooru Matsuura; Yoshinori Narita, both of Nagoya City, Japan

[73] Assignee: NGK Spark Plug Co., Ltd., Nagova City, Japan

[21] Appl. No.: 230,048

[22] Filed: Aug. 9, 1988

[30] Foreign Application Priority Data

Aug. 11, 1987 [JP] Japan ........................... 62-122124[U]
Nov. 20, 1987 [JP] Japan ........................... 62-176435[U]

[51] Int. Cl.[5] .................................................. F16J 1/04

[52] U.S. Cl. ........................................ 92/212; 92/222; 123/193 P; 123/270; 123/279

[58] Field of Search ................. 92/172, 176, 212, 213, 92/223, 224, 222, 248; 123/193 P, 270, 271, 279

[56] References Cited

U.S. PATENT DOCUMENTS

| | | | |
|---|---|---|---|
| 3,730,163 | 5/1973 | Elsbett et al. | 123/270 |
| 4,018,194 | 4/1977 | Mitchell et al. | 123/279 |
| 4,495,684 | 1/1985 | Sander et al. | 92/222 |
| 4,662,326 | 5/1987 | Kohnert | 123/193 P |
| 4,711,208 | 12/1987 | Sander et al. | 123/279 |
| 4,742,759 | 5/1988 | Hayakawa | 92/176 |

FOREIGN PATENT DOCUMENTS

| | | | |
|---|---|---|---|
| 2136594 | 2/1972 | Fed. Rep. of Germany . | |
| 3214093 | 10/1983 | Fed. Rep. of Germany . | |
| 3330554 | 3/1985 | Fed. Rep. of Germany | 123/193 P |
| 3430056 | 1/1986 | Fed. Rep. of Germany | 123/193 P |
| 0238420 | 8/1986 | Fed. Rep. of Germany | 123/193 P |
| 1288819 | 2/1962 | France | 123/279 |
| 0898111 | 1/1982 | Japan | 123/193 P |

*Primary Examiner*—Edward K. Look
*Assistant Examiner*—Thomas Denion
*Attorney, Agent, or Firm*—Foley & Lardner, Schwartz, Jeffery, Schwaab, Mack, Blumenthal & Evans

[57] ABSTRACT

A piston head has a cavity and a central projection projecting into the cavity. A ceramic insert is cast in a piston body so as to cover a piston head portion defining the cavity except the central projection-and-its adjacent piston head portion. The ceramic insert has an edge defining a hole through which the central projection projects into the ceramic insert. In one form of the embodiment, a clearance is provided between the edge of the ceramic insert and the central projection-and-its adjacent piston head portion.

13 Claims, 3 Drawing Sheets

PISTON WITH CERAMIC INSERT THAT COVERS PISTON HEAD PORTION DEFINING CAVITY

BACKGROUND OF THE INVENTION

1. Field of the Invention

The present invention relates in general to internal combustion engines and more particularly to a piston of the type having a ceramic insert that covers a piston head portion defining a cavity that serves as a combustion chamber of an internal combustion engine.

2. Description of the Prior Art

A piston of the above described type is known in the art and exemplarily shown in FIG. 8. The known piston includes a ceramic insert (C) that is embedded or cast in a piston head (A) to entirely cover a piston head portion defining a cavity, i.e., to entirely cover the circumferential wall portion (B) and the bottom wall portion (D) of the cavity.

The insert (C) is embedded or cast in the piston body by installing the ceramic insert on a core and disposed in place in a casting die together with the core so that the ceramic insert (C) is cast in the piston body when the molten metal poured into the die solidifies.

The prior art piston of the above described kind has a disadvantage that in manufacture of the piston cracks, pinholes, a vacant space (E), etc. are liable to be caused in a cast piston body portion adjacent a central projection (F) in the bottom of the cavity due to the shrinkage of the cast metal, causing a stress differential between the piston body portion adjacent the central projection (F) and the remaining piston body portion and allowing the ceramic insert to be broken by the stress differential.

SUMMARY OF THE INVENTION

In accordance with the present invention, there is provided an improved piston which comprises a cast piston body having a piston head which is partly recessed to form a cavity and has a central projection projecting into the cavity, a ring-shaped ceramic insert cast in the piston body in such a way as to cover a piston head portion defining the cavity except the central projection-and-its adjacent piston head portion.

In one form of the invention, a clearance is provided between the central projection-and-its adjacent piston head portion and an edge of the ceramic insert through which the central projection projects into the ceramic insert.

This structure is effective for overcoming the above noted drawbacks inherent in the prior art device.

It is accordingly an object of the present invention to provide an improved piston of the above described kind which enables a ceramic insert to be cast in a piston body assuredly and without any defects.

It is another object of the present invention to provide an improved piston of the above described character which can reduce the fraction defective and therefore the manufacturing expense.

It is a further object of the present invention to provide an improved piston of the above described character which can reduce the piston weight.

It is a further object of the present invention to provide an improved piston of the above described character which is useful for a high performance engine.

DESCRIPTION OF THE PREFERRED EMBODIMENTS

Figure 1:
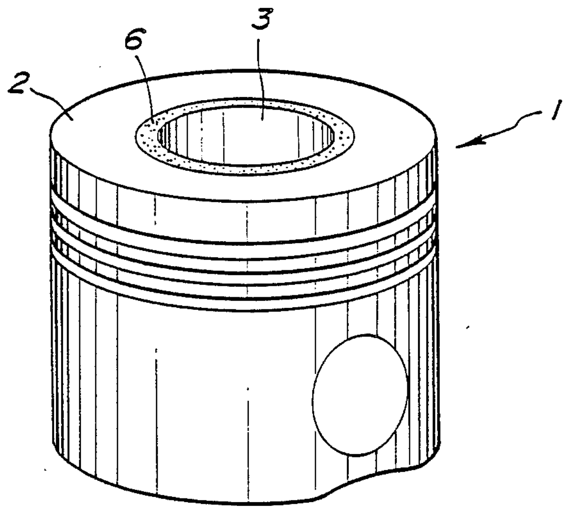
FIG. 1 is a perspective view of a piston in which the present present invention is incorporated.

Referring to FIGS. 2 to 7, a piston 1 has in the piston head 2 thereof a recess or cavity 3 which is of a circular cross section and located concentrically of the piston 1. More specifically, the piston head 2 consists of an annular top surface portion **2*a*, a circular bottom surface portion 2*b* and a cylindrical or inner circumferential surface portion 2*c*. The bottom surface portion 2*b* has a central section that projects upwardly to form a central projection 4. The bottom surface portion 2*b* except the central projection 4-and-its adjacent piston head portion and the circumferential surface portion 2*c* are covered by a ceramic layer or insert 6 made of a material composed mainly of aluminum titanate, etc. The ceramic insert 6 has a ring-like shape having a bottom wall 6*a* covering the bottom surface portion 2*b* of the piston head 2 and a circumferential wall 6*b* covering the circumferential surface portion 2*c* of the piston head 2. The bottom wall 6*a* has at the substantially central portion thereof a through hole 7 that allows the central projection 4 to project into the cavity 3** that serves as a combustion chamber.

In manufacture, the ceramic insert 6 is fitted on a core (not shown) and disposed in place together with the core within a casting die (not shown) for casting the piston 1. After molten metal poured into the die solidifies, the ceramic insert 6 is embedded in a piston body 5 made of the cast metal, i.e., cast in place in the piston body 5.

Figure 2:
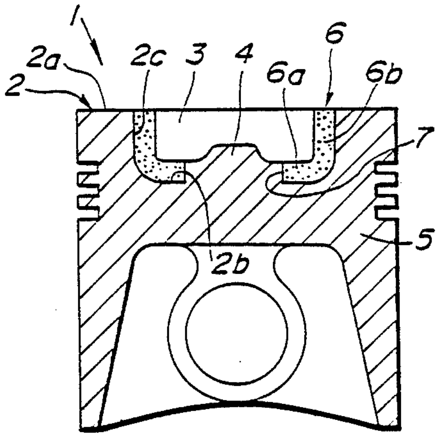
FIGS. 2 to 7 are sectional views of the piston of FIG. 1 and showing several embodiments of the present invention.
Figure 3:
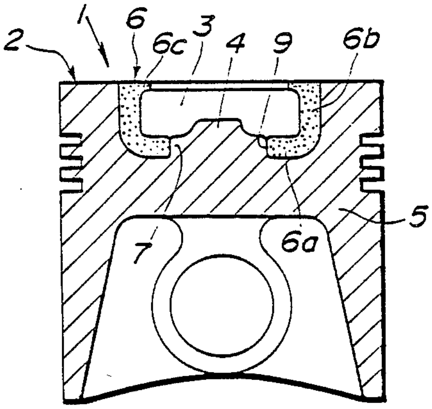

FIG. 3 shows another embodiment which is substantially similar to the previous embodiment of FIG. 2 except that the edge 9 of the ceramic insert 6 defining the through hole 7 and joined with the central projection 4-and-its adjacent piston head portion is rounded or chamferred at the upper and lower terminations thereof and that the ceramic insert 6 has an inward flange **6*c* at the upper end of the circumferential wall 6*b*** thereof.

Figure 4:
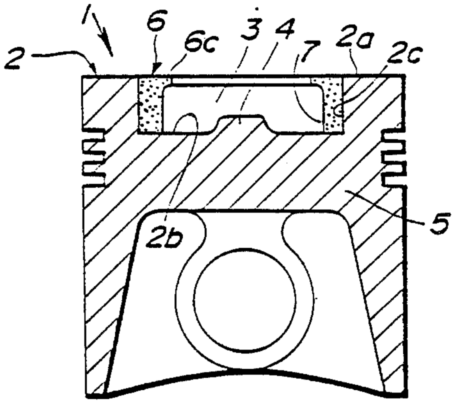

FIG. 4 shows a further embodiment which is substantially similar to the previous embodiment of FIG. 1 except that the through hole 7 is increased in diameter so that the ceramic insert 6 covers the circumferential surface portion **2*b* of the piston head 2 only and that the ceramic insert 6 has an inward flange 6*c* at the upper end of the circumferential wall 6*b*** thereof.

Figure 5:
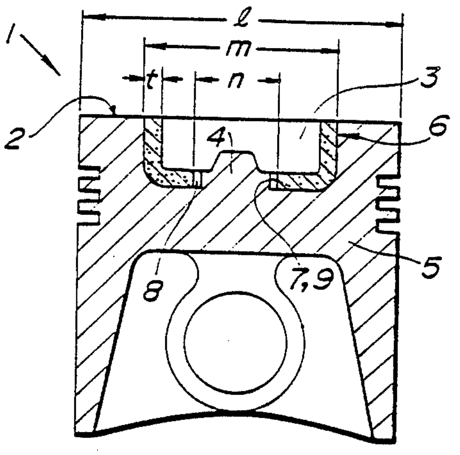

FIG. 5 shows a further embodiment which is substantially similar to FIG. 2 except that the ceramic insert 6 is cast in the piston body 5 in such a way that a clearance 8 is provided between the central projection 4-and-its adjacent piston head portion and the edge of the ceramic insert 6 defining the through hole 7. More specifically, the central projection 4-and-its adjacent piston head portion has a cylindrical surface portion that is surrounded by the cylindrical edge of the ceramic insert by providing therebetween the clearance 8. The clearance 8 is, for example, set to be 0.1 mm when the piston 1 is 80 mm in outer diameter (l) and the ceramic insert 6 is 50 mm in outer diameter (m), 4 mm thick (t) and formed with the through hole 7 of 20 mm in diameter (n). This embodiment can prevent the aforementioned breakage of the ceramic insert more assuredly even when the ceramic insert 6 and the central projection 4-and-its adjacent piston head portion are subjected to cyclic heating and cooling repeatedly since the clearance 8 can reduce the forces transferred from the central projection 4-and-its adjacent piston head portion to the ceramic insert 6 during such cyclic heating and cooling.

Figure 6:
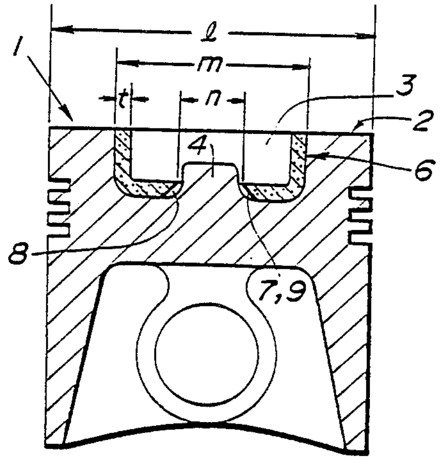

FIG. 6 shows a further embodiment which is substantially similar to FIG. 5 except that the through hole 7 is tapered, i.e., the edge of the ceramic insert 6 defining the through hole 7 is tapered so as to encircle a base portion of the central projection 4. The base portion of the central projection 4 increases in diameter in such a way as to form a curved outline so that the outer surface of the central projection 4 can join the bottom surface portion **2*b* of the piston head 2 smoothly. This embodiment is so sized that the cast piston body 5 is 100 mm in outer diameter (l), the ceramic insert 6 is 60 mm in outer diameter (m) and 5 mm thick (t) and the tapered through hole 7** is 12 mm in minimum diameter (n).

Figure 7:
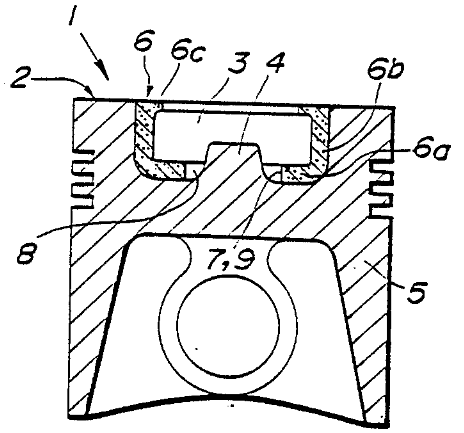
Figure 8:
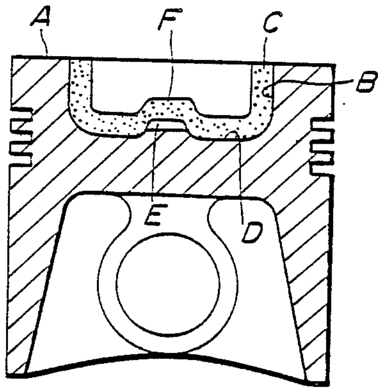
FIG. 8 PRIOR ART
FIG. 8 is a view similar to FIGS. 2 to 7 but showing a prior art piston.

FIG. 7 is a further embodiment which differs from the embodiment of FIG. 6 in that the through hole 7 is cylindrical, i.e., defined by a cylindrical edge of the ceramic insert 6 so as to encircle the curvedly outlined base portion of the central projection 4 and that the ceramic insert 6 has an inward flange **6*c* at the upper end of the circumferential wall 6*b*** thereof.

In the foregoing, it is to be noted that the clearance 8 is preferably set to be larger than 0.2% ×(n).

It is to be further noted that in case where cracks are caused in the wall defining the combustion chamber, i.e., in the ceramic insert and the central projection of the cast piston body a number of pinholes or the like small cavities are correspondingly caused in the wall of the combustion chamber, resulting in that intake fuel partly flows into the small cavities to cause incomplete combustion thereof and thereby cause smoke and emission of HC, CO, etc.

It is to be further noted that provision of the inward flange to the upper end of the ceramic insert as in the embodiments of FIGS. 4 and 7 is effective for attaining complete combustion of intake fuel and therefore for preventing smoke and emission of HC, CO, etc.

What is claimed is:

1. A piston comprising:

a cast piston body having a piston head which is partly recessed to form a cavity and has a central projection projecting into said cavity;

a ring-shaped ceramic insert cast in said piston body in such a way as to cover a piston head portion defining said cavity except said central projection-and-its adjacent piston head portion; and wherein said piston head includes a top surface portion, a bottom surface portion and a circumferential surface portion between said top surface portion and said bottom surface portion, said bottom surface portion having said central projection, said ceramic insert being so shaped as to cover circumferential surface portion of said piston head only.

2. A piston as set forth in claim 1 wherein said ceramic insert is generally cylindrical in shape and has at an upper end thereof an inward flange.

3. A piston comprising:

a cast piston body having a piston head which is partly recessed to form a cavity and has a central projection projecting into said cavity; and a ring-shaped ceramic insert cast in said piston body insuch a way as to cover a piston head portion defining said cavity except said central projection-and-its adjacent piston head portion;

said ceramic insert having an edge defining a hole through which said central projection projects into said ceramic insert, said hole being so sized as to provide a clearance between said edge and said central projection-and-its adjacent piston head portion.

4. A piston as set forth in claim 3 wherein said central projection-and-its adjacent piston head portion has a cylindrical portion which is surrounded by said edge by providing therebetween said clearance, said edge being cylindrical.

5. A piston as set forth in claim 3 wherein said central projection-and-its adjacent piston head portion has a base portion which increases in diameter in such a way as to form a curved outline and is surrounded by said edge which is tapered.

6. A piston as set forth in claim 3 wherein said central projection-and-its adjacent piston head portion has a base portion which increases in diameter in such a way as to form a curved outline and is surrounded by said edge which is cylindrical.

7. A piston comprising:

a cast piston body having a piston head which is partly recessed to form a cavity and includes a top surface portion, a bottom surface portion and a circumferential surface portion between said top surface portion and said bottom surface portion;

said bottom surface portion having a central projection projecting into said cavity; and a ring-shaped ceramic insert cast in said piston body and having a circumferential wall portion covering said circumferential surface portion of said piston head and a bottom wall portion covering said bottom surface portion of said piston head except said central projection-and-its adjacent piston head portion;

said bottom wall of said ceramic insert having an edge defining a hole through which said central projection projects into said cavity, said hole being so sized as to provide a clearance between said edge and said central projection-and-its adjacent piston head portion.

8. A piston as set forth in claim 7 wherein said central projection-and-its adjacent piston head portion has a cylindrical portion which is surrounded by said edge which is cylindrical.

9. A piston as set forth in claim 7 wherein said central projection-and-its adjacent piston head portion has base portion which increases in diameter in such a way as to form a curved outline and is surrounded by said edge which is tapered.

10. A piston as set forth in claim 7 wherein said central projection-and-its adjacent piston head portion has a base portion which increases in diameter in such a way as to form a curved outline and is surrounded by said edge which is cylindrical.

11. A piston comprising:

a cast piston body having a piston head which is partly recessed to form a cavity and includes a top surface portion, a bottom surface portion and a circumferential surface portion between said top surface portion and said bottom surface portion;

said bottom surface portion having a central projection projecting into said cavity; and a ring-shaped ceramic insert cast in said piston body in such a way as to cover only said circumferential portion of said piston head.

12. A piston as set forth in claim 11 wherein said ceramic insert is generally cylindrical and has an inward flange at the upper end thereof.

13. A piston comprising:

a cast piston body having a piston head which is partly recessed to form a cavity and has a central projection projecting into said cavity;

a ring-shaped ceramic insert cast in said piston body in such a way as to cover a piston head portion defining said cavity except said central projection-and-its adjacent piston head portion; and wherein said piston head, which is partly recessed to form a cavity, includes a generally flat annular top surface portion, and wherein said cavity is defined by a generally flat bottom surface portion of said piston head at the bottom of said cavity, and a circumferential surface portion between said top surface and said bottom surface portion;

wherein said central projection projects into said cavity from said generally flat surface portion; and wherein said ring-shaped ceramic insert includes a circumferential wall portion covering said circumferential surface portion of said piston head, and a bottom wall portion covering a part of said bottom surface portion of said piston head, said covered part not including said central projection and a generally annular portion of said generally flat bottom surface portion surrounding said central portion.

* * * * *